(12) United States Patent
Bueno De Santiago et al.

(10) Patent No.: US 10,020,715 B2
(45) Date of Patent: Jul. 10, 2018

(54) MANUFACTURING A PERMANENT MAGNET MODULE

(71) Applicant: ALSTOM RENEWABLE TECHNOLOGIES, Grenoble (FR)

(72) Inventors: Adrian Bueno De Santiago, Barcelona (ES); César Muñiz Casais, Taradell (ES)

(73) Assignee: GE Renewable Technologies Wind B.V., Breda (NL)

( * ) Notice: Subject to any disclaimer, the term of this patent is extended or adjusted under 35 U.S.C. 154(b) by 155 days.

(21) Appl. No.: 14/860,616

(22) Filed: Sep. 21, 2015

(65) Prior Publication Data

US 2016/0094112 A1    Mar. 31, 2016

(30) Foreign Application Priority Data

Sep. 26, 2014    (EP) ..................... 14382366

(51) Int. Cl.
*B29C 70/82*    (2006.01)
*H02K 15/03*    (2006.01)
(Continued)

(52) U.S. Cl.
CPC ............. *H02K 15/03* (2013.01); *B29C 65/48* (2013.01); *B29C 65/562* (2013.01); *B29C 70/82* (2013.01);
(Continued)

(58) Field of Classification Search
CPC ........ B29C 70/82; B29C 65/48; B29C 65/562
See application file for complete search history.

(56) References Cited

U.S. PATENT DOCUMENTS 4,910,861 A * 3/1990 Dohogne ............... H02K 1/278
                                                    264/272.2
5,038,460 A * 8/1991 Ide .......................... H02K 5/08
                                                    264/272.2
(Continued)

FOREIGN PATENT DOCUMENTS

EP       2 680 401 A1    1/2014
JP     2011 055687 A     3/2011
(Continued)

OTHER PUBLICATIONS

European Search Report for EP 14382366.4, dated Apr. 17, 2015, 8 pgs.
EP Office Action, dated Jul. 12, 2017.

*Primary Examiner* — Jill L Heitbrink
(74) *Attorney, Agent, or Firm* — Dority & Manning, P.A.

(57) ABSTRACT

In a first aspect, a method is provided for manufacturing a permanent magnet module for a generator by using a mold with a resin inlet and a heating system for heating the inside of the mold. The method comprises placing inside the mold a module base with one or more receptacles for receiving permanent magnets, and inserting permanent magnets in the receptacles of the module base. The method further comprises closing the mold having in its inside the module base with inserted permanent magnets, and introducing resin into the closed mold through the inlet of the mold. The method still further comprises causing the heating system to operate for at least partially curing the resin. In a second aspect, permanent magnet modules are provided manufactured by performing any of the previous methods of manufacturing a permanent magnet module.

17 Claims, 8 Drawing Sheets

(51) Int. Cl.
*B29C 65/48* (2006.01)
*B29C 65/56* (2006.01)
*H02K 15/12* (2006.01)
*H02K 1/27* (2006.01)
*B29K 101/10* (2006.01)
*B29K 105/20* (2006.01)
*B29K 705/00* (2006.01)
*B29L 31/34* (2006.01)
*H02K 7/18* (2006.01)

(52) U.S. Cl.
CPC .............. *H02K 1/276* (2013.01); *H02K 15/12* (2013.01); *B29K 2101/10* (2013.01); *B29K 2105/203* (2013.01); *B29K 2705/00* (2013.01); *B29K 2995/0007* (2013.01); *B29K 2995/0008* (2013.01); *B29L 2031/34* (2013.01); *H02K 7/1838* (2013.01); *Y02E 10/725* (2013.01)

(56) References Cited

U.S. PATENT DOCUMENTS

| | | | | |
|---|---|---|---|---|
| 2006/0218777 | A1* | 10/2006 | Swift | H02K 3/345 29/605 |
| 2008/0276449 | A1* | 11/2008 | Groendahl | H01F 7/0221 29/607 |
| 2012/0098271 | A1* | 4/2012 | Bayer | H01F 7/0221 290/55 |
| 2012/0133230 | A1* | 5/2012 | Jansen | H02K 1/2766 310/156.12 |
| 2012/0222289 | A1* | 9/2012 | Nagai | H02K 1/276 29/598 |

FOREIGN PATENT DOCUMENTS

| | | |
|---|---|---|
| JP | 2013-115845 A | 6/2013 |
| JP | 2014 036486 A | 2/2014 |
| WO | WO 2014/135902 | 9/2014 |

* cited by examiner

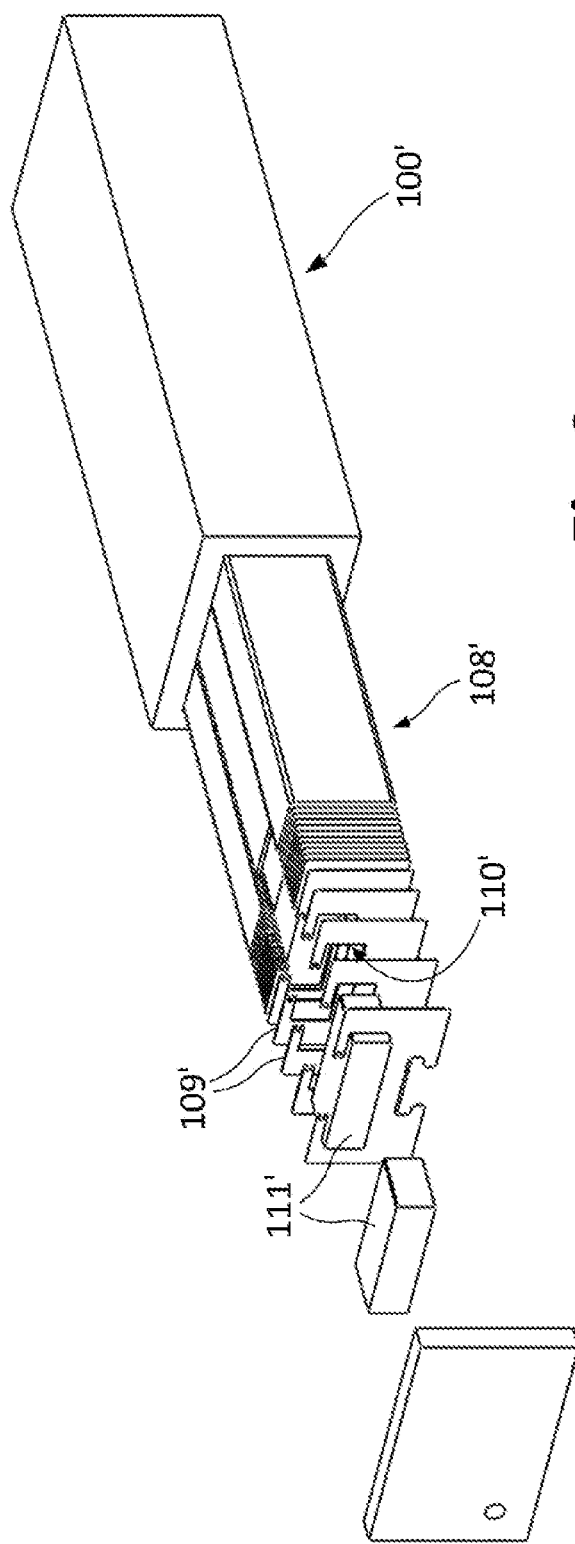

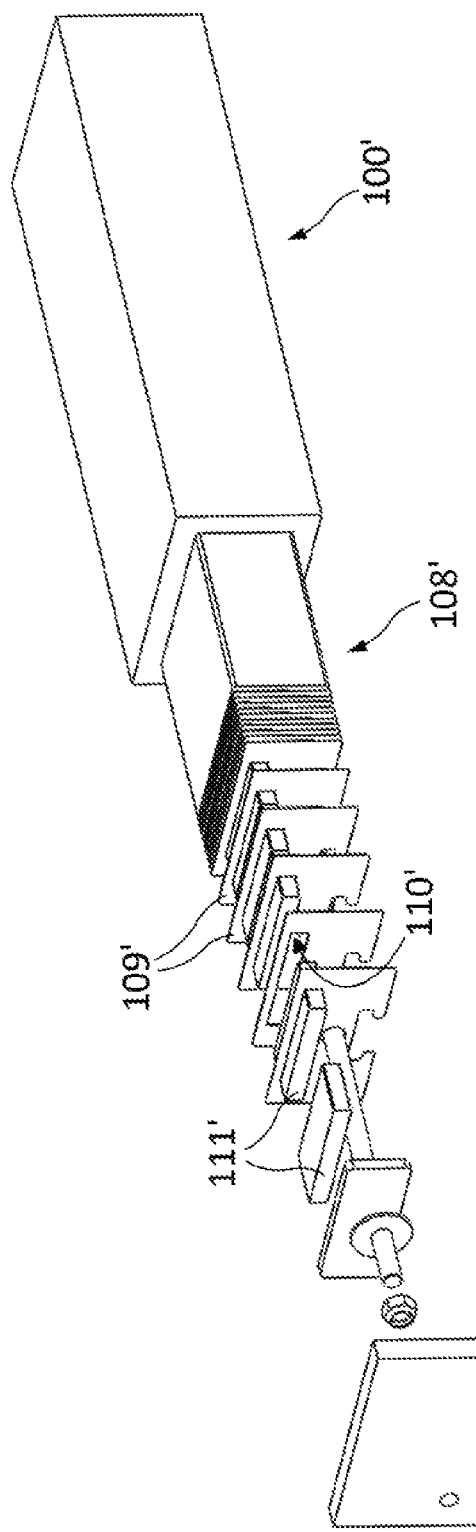

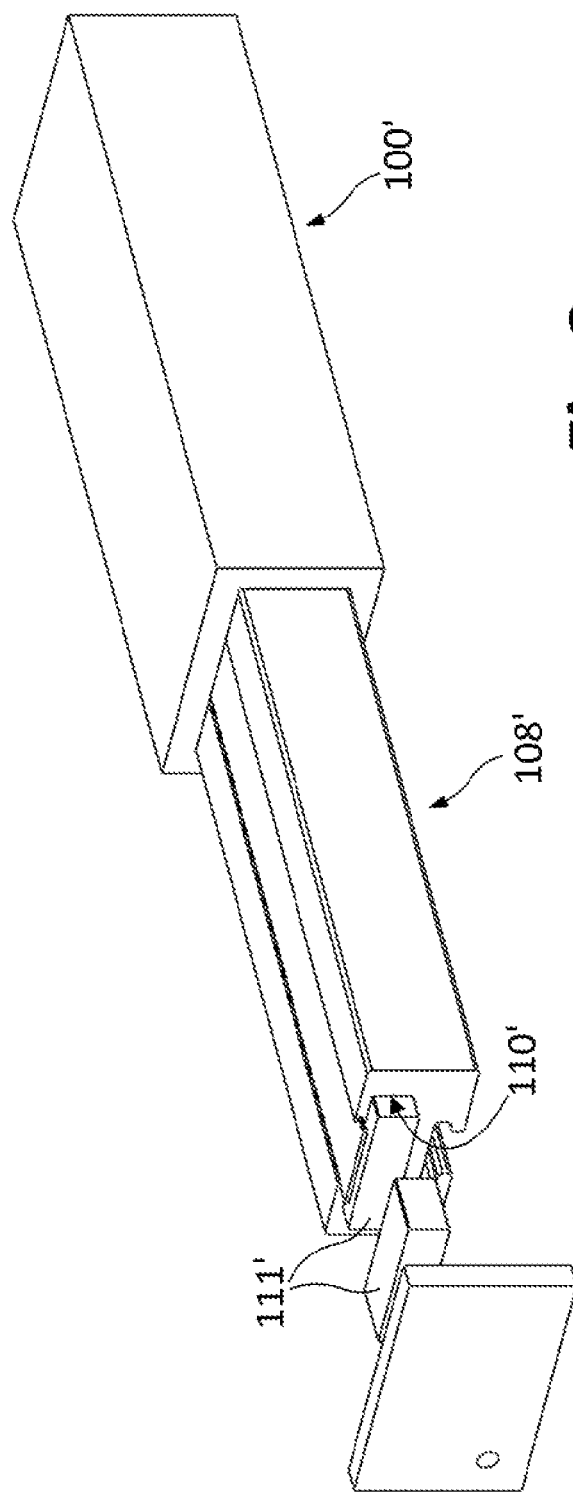

MANUFACTURING A PERMANENT MAGNET MODULE

This application claims priority to European patent application no. 14382366.4, filed on Sep. 26, 2014, the entire contents of which are hereby incorporated by reference in its entirety.

The present disclosure relates to methods of manufacturing a permanent magnet module for a generator, such as e.g. a wind turbine generator, and to permanent magnet modules manufactured by performing any of said methods.

BACKGROUND ART

Generators having a rotor with permanent magnets are known. They are generally deemed to be reliable and require less maintenance than other generator topologies.

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation is normally transmitted through a rotor shaft to a generator, either directly or through the use of a gearbox. This way, the generator can produce electricity which can be supplied to the electrical grid.

Particularly for offshore wind turbines, direct drive systems employing permanent magnets are usually chosen. Such a direct drive wind turbine generator may have e.g. a diameter of 6-8 meters and a length of e.g. 2-3 meters. Hundreds of magnets may need to be attached, e.g. by screwing or gluing, to the circumference of the rotor. This manufacturing process can be cumbersome.

This size and type of generator is not limited to offshore applications and not even to the field of wind turbines only. Generators of considerable dimensions may also be found e.g. in steam turbines and water turbines.

Examples of permanent magnet rotors that aim at dealing with the aforementioned problem of the attachment of a large number of magnets may comprise a rotor rim and a plurality of permanent magnet modules arranged on the outer or inner circumference of the rotor rim.

A permanent magnet module may be defined as a unit having a plurality of permanent magnets, such that the plurality of magnets can be mounted and unmounted together. Such a module may have a module base with a shape suitable for housing a plurality of permanent magnets. The magnets may be fixed to the base in a diversity of manners. The base may be configured to be fixed to a rotor rim in such a way that the plurality of magnets are fixed together to the rotor rim through the module base. The use of permanent magnet modules may facilitate the manufacturing of a generator rotor.

Permanent magnets may be fixed to the module base mechanically by using e.g. wedges, and/or welding, and/or screwing, etc. Regardless of the attachment method chosen, such attachments preferably should be easy to make, in a relatively cheap manner, and the attachments should be able to withstand all relevant loads and do not affect the magnetic field in a negative manner.

The present disclosure aims at improving the prior art methods of manufacturing permanent magnet modules and the prior art permanent magnet modules.

SUMMARY

In a first aspect, a method is provided for manufacturing a permanent magnet module for a generator by using a mold with a resin inlet and a heating system for heating the inside of the mold.

The method comprises placing inside the mold a module base with one or more receptacles for receiving permanent magnets, and inserting permanent magnets in the receptacles of the module base. The method further comprises closing the mold having the module base with the inserted magnets in its inside, and introducing resin into the closed mold through the inlet of the mold. The method still further comprises causing the heating system to operate for at least partially curing the resin.

An aspect of the proposed method may be that a module of permanent magnets may be fabricated with a relatively strong attachment of the magnets to the base. Due to the viscose nature of the resin, it may flow during its introduction through and to any gap between the magnets and the base. Therefore, once (at least partially) cured, the resin may implement a complete and secure attachment of the magnets to the module base.

Herein, a receptacle may be a cavity that is configured to receive and partially or completely enclose and/or retain a permanent magnet. A receptacle may also be a surface or portion of the base that is adapted to receive a magnet without enclosing the magnet.

Another aspect of this method is that permanent magnet modules may be relatively easily fabricated, since fastening of the magnets to the base is implemented by introducing resin into the mold and then heating the mold. This manufacturing approach may be rather less cumbersome than others based on mechanical means, such as e.g. wedging, screwing, etc.

With respect to the resin to be used, different types of bonding resins may be applied in the context of the suggested method, such as e.g. epoxy, polyester, vinyl ester, etc.

In examples of the method, first, the module base may be placed alone (without permanents magnets) inside the mold and, afterwards, the magnets may be inserted in receptacles of the base (once it is entirely inside the mold). In alternative examples, first, the magnets may be inserted in the receptacles of the base and, afterwards, the module base with the inserted magnets may be placed inside the mold.

One alternative or another may be selected depending on e.g. how the module base is formed (e.g. whether it is a single solid body or not), the configuration of the mold, etc. If, for instance, the module base is a single solid body, the magnets may be inserted in cavities of the base outside the mold (i.e. prior to inserting the base into the mold) and, afterwards, the base (with inserted magnets) may be placed in the mold.

According to examples, causing the heating system to operate may comprise causing the heating system to operate until the resin is completely cured. In alternative implementations, the heating system may operate until the resin is partially cured. In this last case, depending on the type of resin used, the curing of the resin may be completed outside the mold at ambient temperature, for example.

In some examples, the mold may further comprise an outlet for sucking air out of the mold, and the method may further comprise, prior to introducing the resin, creating a vacuum inside the closed mold. This vacuum may be created by sucking air out of the mold through the outlet of the mold before introducing the resin.

The combination of creating a vacuum and introducing a resin is known as an infusion process. The vacuum is used to reduce the pressure at one end of the inside of the mold (containing the base with inserted magnets) thus allowing atmospheric pressure to force the resin through the gaps between the magnets and the base.

Typical curing temperatures for infusion processes may range between 50° to 70° C. The molds used for infusion processes may thus be cheap. Furthermore, the infusion process may use slightly lower performance resins (in terms of strength) due to a low viscosity requirement for facilitating the resin infusion. The infusion process is thus usually considered to be a cheap process.

An aspect of implementing such an infusion process may be that the resin may substantially completely fill the gaps between the magnets and the module base. Therefore, junctions substantially without air "bubbles" between magnets and the base may be achieved with this option. Permanent magnet modules with a strong fastening of magnets to the base may therefore be fabricated by using infusion.

In some implementations, the module base may be a single solid body. Alternatively, the module base may comprise a stack of metallic laminas. In this last case, the resin may also fill the gaps between laminas, so that a relatively strong attachment also between laminas may be achieved, especially if resin infusion is used. An aspect of this may be that attachment between laminas and attachment of magnets to laminas may be implemented at the same time by heating the resin.

According to some examples, each of the metallic laminas may be coated with adhesive able to be activated by heat at one face of the metallic lamina. In more particular examples, the method may comprise performing the coating of the laminas with the adhesive able to be activated by heat prior to placing the module base inside the mold.

An adhesive able to be activated by heat may be defined as a passive substance which is not adherent while it is at a temperature below a temperature threshold, but becomes adherent when said temperature threshold is exceeded. Causing the heating system of the mold to operate may therefore result in a double effect: curing the resin and activating said passive adhesive. Therefore, attachment between laminas and attachment of magnets to laminas may be implemented at the same time also in this case by heating the inside of the mold.

In examples of the method, each of the metallic laminas may be coated with electrically insulating material at one face of the metallic lamina. And in more particular examples, the method may further comprise performing the coating of the laminas with the electrically insulating material prior to placing the module base inside the mold. The presence of electrically insulating material between laminas may improve the performance of the module when used in a generator. In particular, eddy currents may be reduced or avoided.

In some implementations, laminas may be coated with both materials. One face of the laminas may be coated with the passive adhesive and the opposite face may be coated with the electrically insulating material. Alternatively, both sides of the laminas may be doubly coated with electrically insulating material (in an inner layer) and passive adhesive (in an outer layer). In examples of methods, one of the coatings or both coatings may be performed within the scope of the method or, alternatively, the laminas may be received pre-coated, thereby eliminating the step of coating the laminas as part of the method.

In alternative implementations, the laminas may not be coated but, instead, a thin insulation foil or fabric matrix may be placed between laminas. The insulation foils (or fabric matrixes) may therefore be impregnated with resin during injection of the resin to be cured afterwards. Placement of such an insulation sheet (or fabric matrix) between laminas may cause a certain separation between adjacent laminas, thereby improving isolating properties of the module base.

Alternatively to placing an insulation sheet (or fabric matrix) between adjacent laminas, the resin may be a resin containing hard particles which may similarly generate a certain separation between adjacent laminas, thereby improving isolating properties of the module base.

In some implementations, the magnets may be surrounded by a thin insulation foil or fabric matrix which may therefore be impregnated with resin during injection of the resin to be cured afterwards. Placement of such an insulation sheet (or fabric matrix) surrounding the magnets may cause a certain separation between magnets and laminas, thereby improving isolating properties of the module base.

In some examples, the method may further comprise pressing the stacked metallic laminas to each other through a pressing mechanism. This pressing mechanism may comprise, for example, a stud and one or more fasteners configured to be fastened at one end or both ends of the stud.

In more particular examples, pressing the stacked metallic laminas may comprise arranging the stud in such a way that the stud extends internally to the stack from one side to the opposite side of the stack, and fastening the one or more fasteners at one end or both ends of the stud.

One end of the stud may be formed as a stopper, i.e. shaped in such a way that retention of laminas is caused at said end. In this case, only one fastener to be placed at the other end (opposite to the stopper end) may be required for exerting the pressure to the stack of laminas. In alternative implementations, if the stopper is not present, respective fasteners for both ends of the stud may be needed.

The pressing of the stacked laminas may produce a module base with a relatively high stiffness, such that the stacked laminas may behave together as a single solid body. This may therefore assist to produce permanent magnet modules with a relatively high stiffness.

In a second aspect, permanent magnet modules are provided which are manufactured by performing any of the previous methods of manufacturing a permanent magnet module.

In some examples, generators may also be provided comprising a rotor having a plurality of any of the previous permanent magnet modules. According to examples, wind turbines may also be provided comprising any of said generators.

BRIEF DESCRIPTION OF THE DRAWINGS

Non-limiting examples of the present disclosure will be described in the following, with reference to the appended drawings, in which:

FIGS. 6, 7 and 8 illustrate views similar to the ones shown in FIGS. 1, 2 and 3 respectively, of different examples of permanent magnet modules.

DETAILED DESCRIPTION OF EXAMPLES

Figure 1:
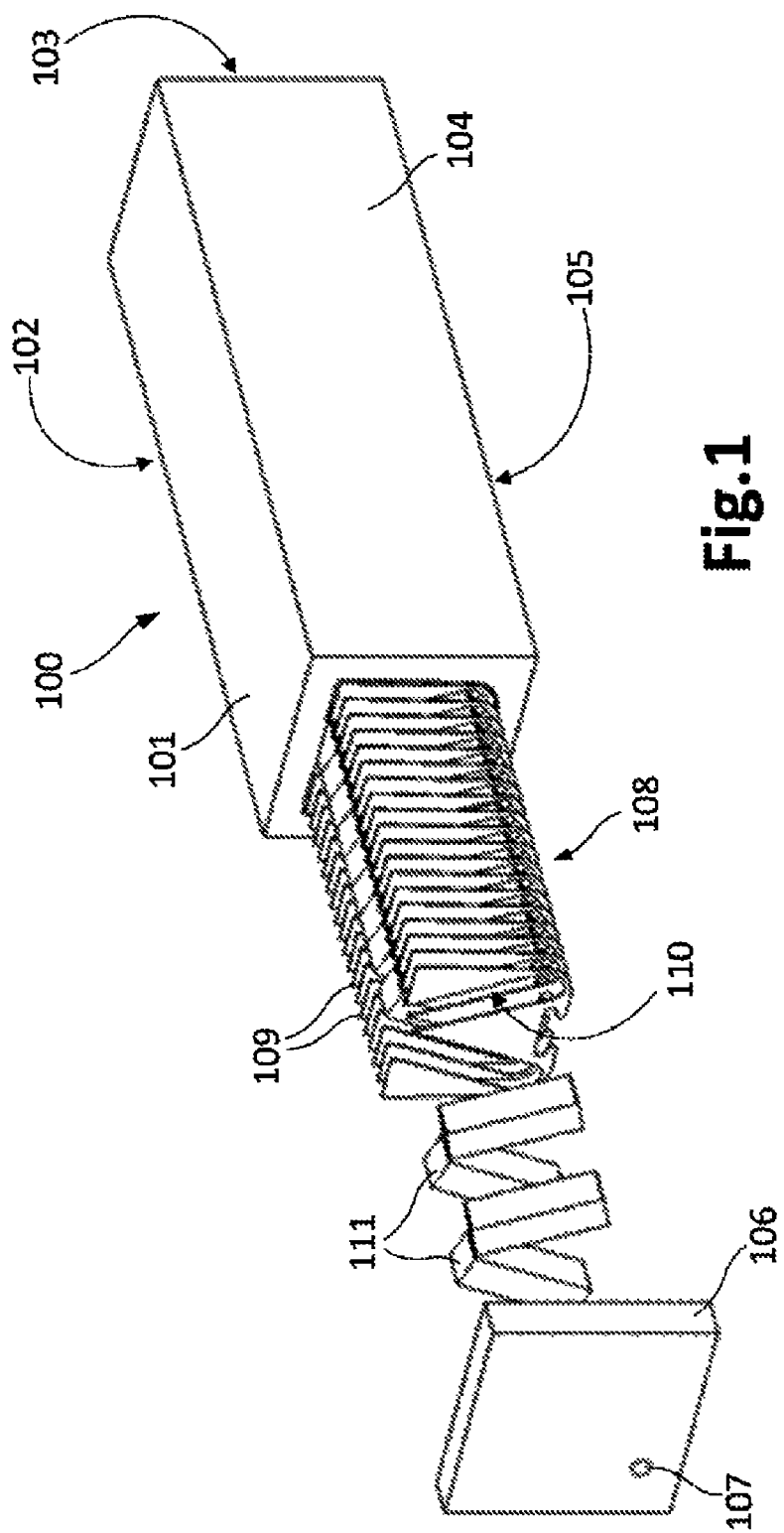
FIG. 1 schematically represents a perspective view of a mold and a plurality of laminas forming a module base and permanent magnets being introduced in the mold for performing examples of the method of manufacturing a permanent magnet module.

FIG. 1 schematically represents a perspective view of a mold 100, and a plurality of laminas/sheets 109 forming a module base 108 and permanent magnets 111 being introduced in the mold 100 in the context of a method of manufacturing a permanent magnet module.

The laminas 109 may have a shape such that, when stacked, the module base 108 is formed with suitable receptacles 110. In this case, the receptacles may be cavities 110 for housing permanent magnets 111. In this particular case, the mold 100 is shown having a main body and a cover 106. The body of the mold 100 may comprise an upper wall 101, a lower wall 105 and side walls 102-104.

The side wall 103 may be at a first end of the mold 100. The mold 100 may have at the other end (opposite to the first end 103) an opening through which the module base 108 and magnets 111 can be introduced into the mold 100. The cover 106 may be configured to cover said opening in such a way that the mold 100 can enclose the base 108 and magnets 111 in its inside.

The mold 100 may also comprise an inlet 107 for introducing resin into the mold 100. In the particular case of FIG. 1, the resin inlet 107 is shown comprised in the cover 106. The other end 103 may comprise an outlet (not shown) for sucking air out of the mold 100, such that a vacuum may be created inside the mold 100.

With the above mentioned resin inlet 107 and air outlet (not shown), resin could be introduced into the mold 100 according to an infusion process. In this context, a vacuum may be created inside of the mold 100. The reduction of the pressure may allow atmospheric pressure to force the resin (from the other end of the mold 100) through gaps between the magnets 111 and the module base 108, e.g. after a valve controlling the resin influx is opened.

The mold 100 may also comprise a heating system (not shown) for heating the inside of the mold 100.

References to the arrangement shown in FIG. 1 may be made in other parts of the description in relation with other figures illustrating methods of manufacturing a permanent magnet module.

Figure 2:
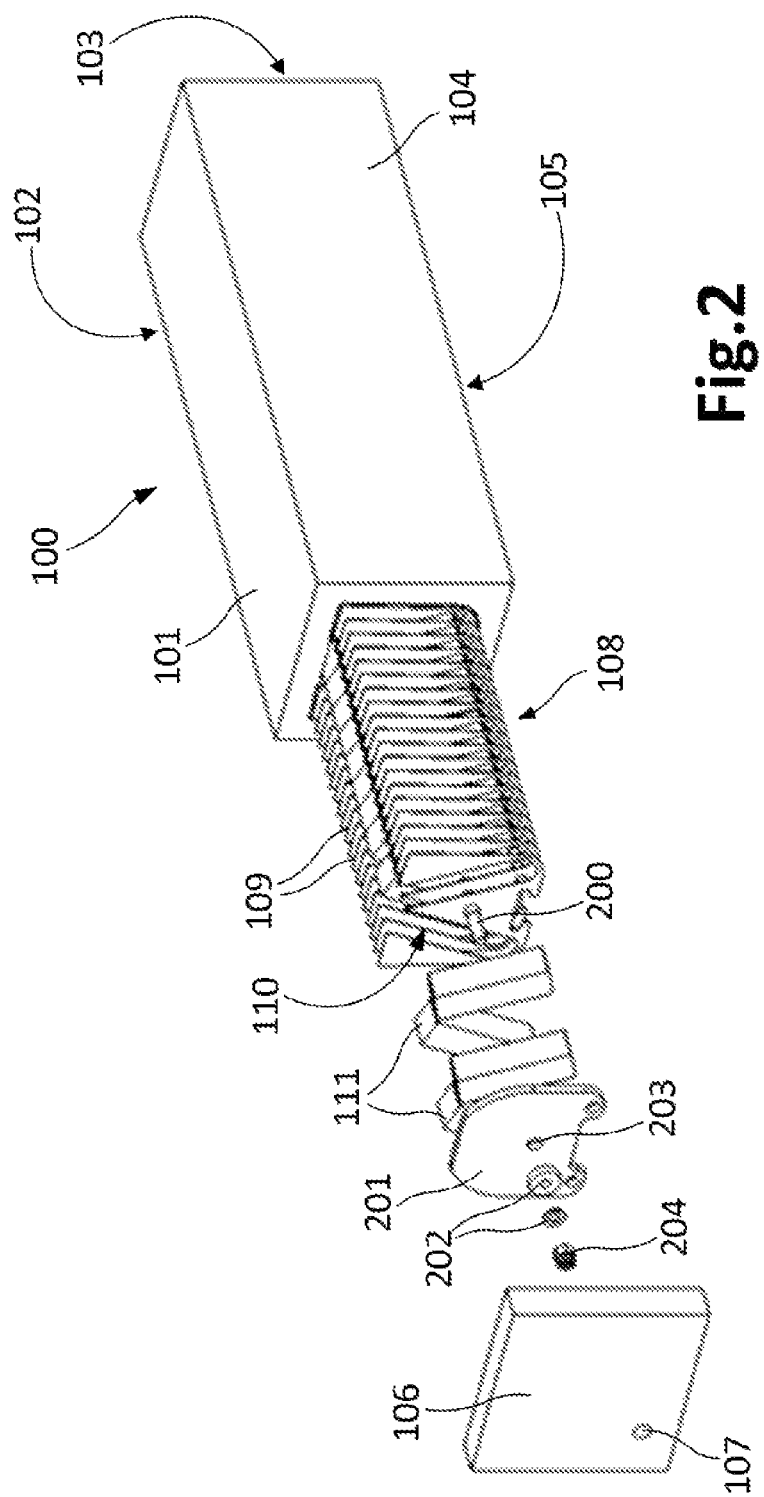
FIG. 2 schematically represents a perspective view similar to the one depicted in FIG. 1 further showing a mechanism for pressing the laminas together.

FIG. 2 schematically represents a perspective view similar to the one depicted in FIG. 1. Reference numbers of FIG. 1 have been reused in FIG. 2 for indicating the same or similar elements.

One difference with respect to FIG. 1 is that a mechanism for pressing the stacked laminas to each other is further shown in FIG. 2. This pressing mechanism may be based on a stud 200, a pressing plate 201 and corresponding fasteners 202, 204. The fasteners may comprise a nut 204 with corresponding washers 202.

The stud 200 is shown arranged in such a way that the stud 200 extends internally to the stack of laminas 109 from one side to the opposite side of the stack. A first end of the stud 200 may be formed as a stopper having the function of retaining laminas 109 at the first end of the stud 200. This stopper is not shown in FIG. 2 because the first end of the stud 200 is arranged inside the mold.

The stud 200 may comprise a second end (the only end shown in FIG. 2), and the pressing plate 201 may have a hole 203 through which the (second end of the) stud 200 can pass.

The second end of the stud 200 may be configured in such a way that fasteners 202, 204 can be fastened to it. For example, this second end of the stud 200 may have a thread form in such a way that the nut 204 can be screwed on it. The fasteners 202, 204 may have the role of keeping the pressing plate 201 fixed at a point of the second end of the stud 200.

This way, the pressing plate 201 can retain the laminas 109 at the second end of the stud 200, such that the stacked laminas 109 are pressed or sandwiched between the pressing plate 201 and the stopper of the other end of the stud 200.

In alternative implementations, the stud 200 may not comprise a stopper end as the one described above. Instead, both ends of the stud 200 may be configured in such a way that suitable fasteners can be fastened to them for fixing a pressing plate at each end of the stud 200. These fasteners and plates may be configured in such a way that, when fixed/fastened at both ends of the stud 200, the stacked laminas 109 are pressed or sandwiched between the plates in a similar way as explained before.

Taking into account the configuration of FIG. 2, the module base 108 may be completely formed by stacking the laminas 109 and pressing them to each other outside the mold 100. Once the module base 108 has been formed, the permanent magnets 111 may be inserted into receptacles 110 of the base 108 also outside the mold 100. The receptacles almost completely enclose the magnets. Then, the module base 108 with inserted magnets 111 could be placed together inside the mold 100.

Alternatively, only the base 108 may be formed outside the mold 100 and the magnets 111 may be inserted in corresponding cavities 110 once the base 108 has been placed inside the mold 100. This option could be implemented, for example, with a configuration of the mold 100 wherein its opening (for introducing the base 108 and magnets 111) is arranged at an upper side 101 of the mold 100.

When the module base 108 is formed by stacking laminas 109 (as shown in FIGS. 1 and 2), one face of the laminas 109 may be coated with adhesive able to be activated by heat. In examples of the method of manufacturing a permanent magnet module, this coating may be performed as part of the method. In this case, the coating may be performed prior to placing the laminas 109 inside the mold 100.

In alternative examples, the method may receive the laminas 109 preconfigured with such a coating of adhesive, thereby eliminating the step of coating the laminas as part of the method.

In any case, the heating of the inside of the mold 100 may cause both curing of the resin and activation of the adhesive. Therefore, attachment between laminas 109 and between magnets 111 and laminas 109 may be implemented at the same time during the heating of the inside of the mold 100.

Alternatively or additionally to the coating with adhesive, one face of the laminas 109 can be coated with electrically insulating material. In some implementations of the method of manufacturing a permanent magnet module, this other coating may be performed within the scope of the method. In this case, the coating with electrically insulating material may be performed prior to placing the laminas 109 inside the mold 100.

Alternatively, the method may receive the laminas 109 preconfigured with such a coating of electrically insulating material thereby eliminating the step of coating the laminas.

In some examples of the method, the laminas 109 may be coated with both materials. One face of the laminas 109 may be coated with the adhesive able to be activated by heat, and the other face of the laminas 109 may be coated with the electrically insulating material. Both coatings may be performed as part of the method or, alternatively, the laminas 109 may be received preconfigured with both coatings, thereby eliminating a need to coat the laminas.

Figure 3:
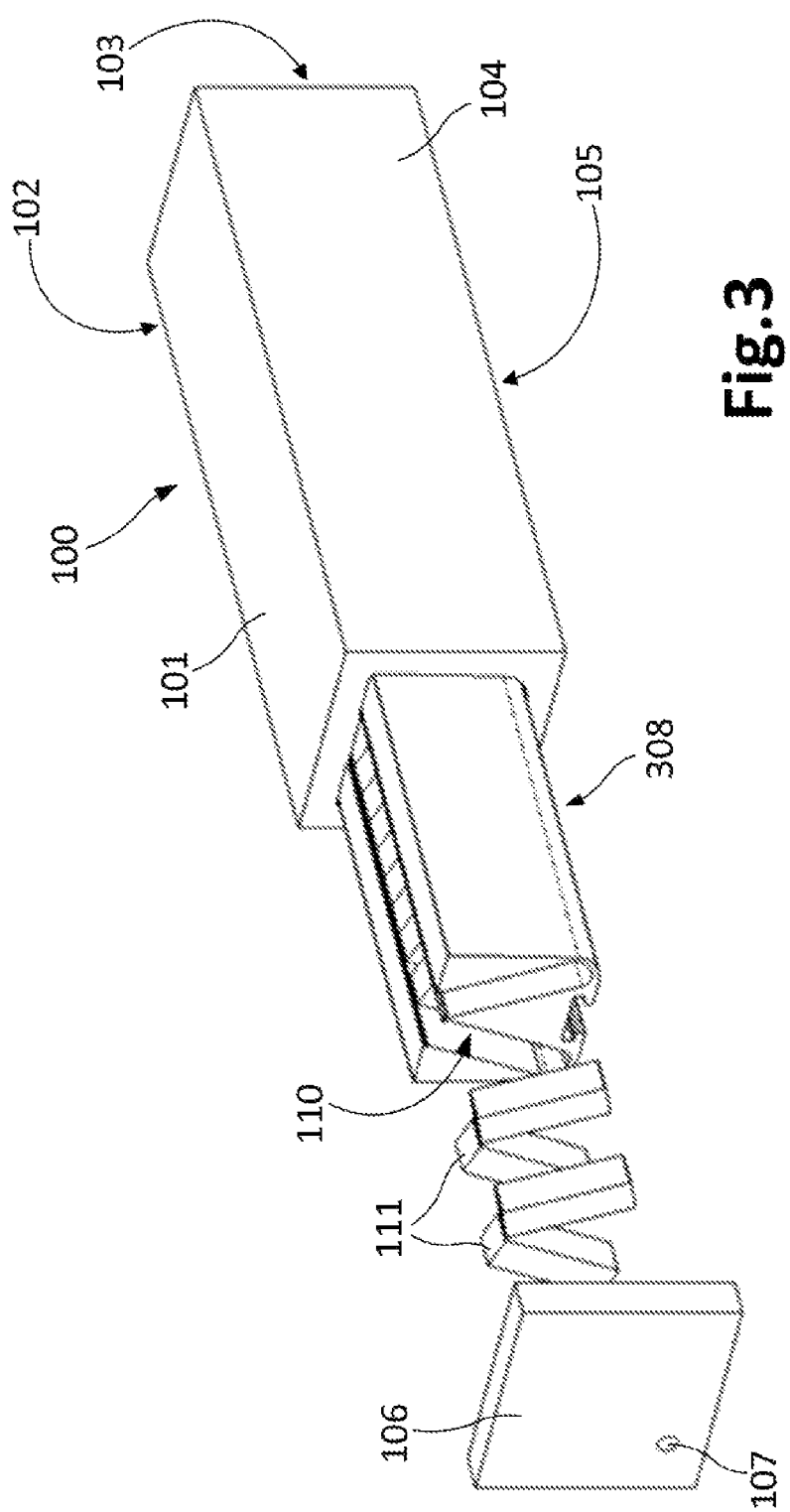
FIG. 3 schematically represents a perspective view of another example of a permanent magnet module.

FIG. 3 schematically represents a perspective view similar to the ones depicted in FIGS. 1 and 2. Reference numbers of FIGS. 1 and 2 have been reused in FIG. 3 for indicating the same or similar elements.

One difference when compared to the previously illustrated examples is that, in the case of FIG. 3, the module base 308 is a single solid body. Instead of forming a stack of laminas as shown in FIGS. 1 and 2, a monolithic base 308 could be used in this case.

An aspect of using such a monolithic base 308 may be that corresponding methods of manufacturing a permanent magnet module may be relatively easy.

In examples of the method of fabricating a permanent magnet module, receptacles 110 of the module base 108, 308 and the magnets 111 may be configured in such a way that different magnet structures may be obtained. For example, the magnets may be arranged according to e.g. an inverted-V structure, a flat structure, etc.

In the particular cases of FIGS. 1-3, respective inverted-V structures of magnets 111 are illustrated.

FIGS. 6, 7 and 8 illustrate respective configurations of a mold 100' along with a module base 108' and magnets 111' being introduced in the mold 100' according to further examples of the method of manufacturing a module of permanent magnets.

In FIG. 6, the module comprises a stack of laminas 109' forming a module base 108'. The laminas 109' comprise an open receptacle 110' configured to receive a permanent magnet 111' in a horizontal orientation. The receptacles 110' partially enclose the magnets 111'. The mold 100' and the process are otherwise comparable to the mold and process described with reference to FIG. 1.

In FIG. 7 on the other hand, the receptacles 110' are configured to receive and completely enclose the permanent magnets 111'. The mold 100' and the process are otherwise comparable to the mold and process described with reference to FIG. 2.

FIG. 8 shows a permanent magnet module wherein the base 108' is formed as a solid block, instead of a stack of laminas/sheets.

In some implementations of the method, one or more pipes (or similar elements) may be arranged along with the module base 108, 308 and magnets 111. The pipes are arranged to occupy space(s) in the mold so that the resin, when introduced into the mold, will not flow into the space(s). After the resin has cured, or at least partially cured, the pipes are then removed from the module to produce open channels that may be used as cooling channels for the permanent magnet module.

Figure 4:
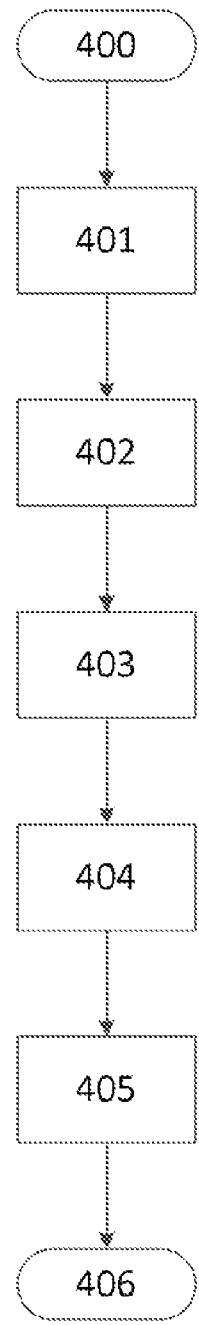
FIG. 4 is a flow chart schematically illustrating a method of manufacturing a permanent magnet module according to an example.

FIG. 4 is a flow chart schematically illustrating a method of manufacturing a permanent magnet module according to an example. This method may use a mold with a resin inlet and a heating system for heating the inside of the mold. This mold may therefore be any of the molds of FIGS. 1-3. Reference numbers of FIGS. 1-3 may be included in the following description about FIG. 4.

The method may comprise an initial block 400 at which preliminary actions, such as e.g. preparing laminas 109 and/or resin, may be undertaken. At block 401, a module base 108, 308 with regions 110 for housing permanent magnets 111 may be placed inside the mold 100. At block 402, permanent magnets 111 may be inserted in the housing regions 110 of the module base 108, 308.

The module base may be formed by either a plurality of laminas 109 or a single solid body 308. As discussed in other parts of the description, placing the module base 108, 308 inside the mold 100 and inserting permanent magnets 111 in housing regions 110 may be performed in different orders. For example, block 401 may be performed before block 402 or conversely.

At block 403, the mold 100 having the module base 108, 308 with inserted permanent magnets 111 inside may be closed by suitably arranging a cover 106 that covers the open end of the mold, thereby closing the mold 100. At block 404, the resin may be introduced into the closed mold 100 through the inlet 107 of the mold. At block 405, operation of the heating system may be caused for at least partially curing the resin.

As explained in other parts of the description, the heating system may operate until the resin has been completely cured or not. In this last case, depending on the resin used, the curing of the resin may be completed outside the mold 100 at ambient temperature, for example.

At block 406, later actions, such as e.g. opening the mold 100 and/or extracting the permanent magnet module from the mold 100, may be performed.

Figure 5:
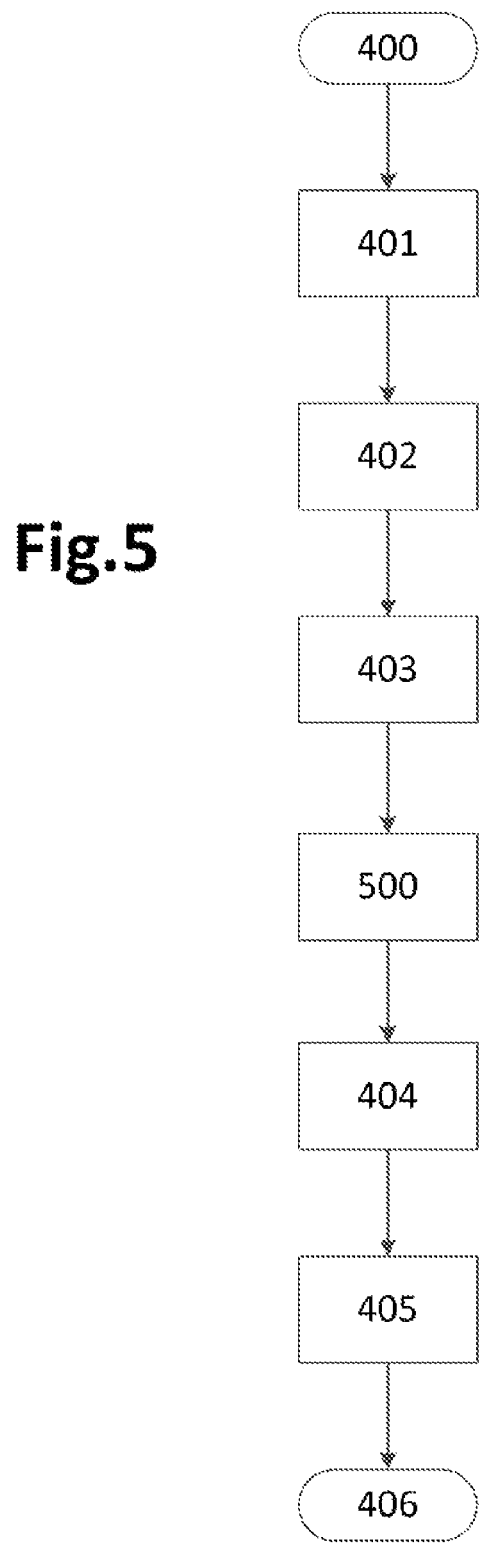
FIG. 5 is a flow chart schematically illustrating a method of manufacturing a permanent magnet module according to another example.

FIG. 5 is a flow chart schematically illustrating a method of manufacturing a permanent magnet module according to another example. This method is similar to the one illustrated in FIG. 4. Hence, reference numbers of FIG. 4 have been reused in FIG. 5 for indicating the same or similar blocks. Reference numbers of FIGS. 1-3 may also be included in the following description about FIG. 5.

One difference with respect to FIG. 4 is that the method of FIG. 5 further comprises, at block 500, creating a vacuum inside the closed mold 100 by sucking air out of the mold 100 through the outlet of the mold 100. Creation of the vacuum may be performed between the closing of the mold 100 (having the module base 108, 308 with inserted permanent magnets 111 inside) and the introduction of the resin into the closed mold 100 through the inlet 107 of the mold 100. In alternative examples, creation of the vacuum and introduction of the resin may be performed simultaneously in such a way that resin is progressively sucked by the vacuum that is being created.

As commented in other parts of the description, the combination of creating the vacuum and the introduction of the resin constitute together an infusion process. Details and advantages of implementing such an infusion process can be found in other parts of the description.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of manufacturing a permanent magnet module for a generator, wherein the permanent magnet module is configured for attachment onto a circumference of a rotor rim for use in the generator, the method comprising:
    using a mold with a resin inlet, the mold being a closed structure defining a completely enclosed internal space;
    placing inside the mold a module base with one or more receptacles for receiving permanent magnets;

inserting the permanent magnets in the receptacles of the module base with a gap between the permanent magnets and the module base;

closing the mold with the module base and inserted permanent magnets completely enclosed within the internal space of the mold;

introducing a resin into the closed mold through an inlet of the mold, wherein the resin flows into the gaps between the permanent magnets and the module base;

heating the enclosed internal space of the mold to at least partially cure the resin; and wherein the permanent magnets are secured to the module base by the at least partially cured resin in the gaps between the permanent magnets and the module base and the module encapsulated in the resin is an elongated longitudinally extending structure configured for attachment on an outer or inner circumference of a rotor rim in a generator.

2. The method according to claim 1, wherein the mold further comprises an outlet, the method further comprising:
creating a vacuum inside the closed mold by sucking air out from the enclosed internal space of the mold through the outlet, prior to introducing the resin.

3. The method according to claim 1, wherein the enclosed internal space is heated until the resin is fully cured.

4. The method according to claim 1, wherein the module base is a unitary body.

5. The method according to claim 1, wherein the module base comprises a stack of metallic laminas.

6. The method according to claim 5, wherein each of the metallic laminas is coated with an adhesive capable of being activated by heat on at least one face of the metallic lamina.

7. The method according to claim 6, further comprising:
performing a coating of the laminas with an adhesive capable of being heat-activated prior to placing the module base inside the mold.

8. The method according to claim 5, wherein each of the metallic laminas is coated with an electrically insulating material on at least one face of the metallic lamina.

9. The method according to claim 8, further comprising:
performing a coating of the laminas with the electrically insulating material prior to placing the module base inside the mold.

10. The method according to claim 5, further comprising:
pressing the stacked metallic laminas to each other using a pressing mechanism.

11. The method according to claim 10, wherein the pressing mechanism comprises a stud and one or more fasteners configured to fasten at one end or both ends of the stud.

12. The method according to claim 11, wherein pressing the stacked metallic laminas comprises:
arranging the stud in such a way that the stud extends from one side of the stack to an opposite side of the stack; and
fastening the one or more fasteners at one or both ends of the stud located at the one side and opposite side of the stack.

13. The method according to claim 2, wherein the module base comprises a stack of metallic laminas.

14. The method according to claim 13, wherein each of the metallic laminas is coated with adhesive capable of being activated by heat on at least one face of the metallic lamina.

15. The method according to claim 6, wherein each of the metallic laminas is coated with an electrically insulating material on at least one face of the metallic lamina.

16. The method according to claim 13, wherein each of the metallic laminas is coated with an electrically insulating material on at least one face of the metallic lamina.

17. The method according to claim 14, wherein each of the metallic laminas is coated with an electrically insulating material on at least one face of the metallic lamina.

* * * * *